United States Patent [19]

Nayak et al.

[11] 4,454,415

[45] Jun. 12, 1984

[54] TRACKING MIRROR ASSEMBLY AND CONTROL SYSTEM FOR AN OPTICAL DATA STORAGE DISC

[75] Inventors: Ashok B. Nayak, La Verne; Leonard Laub, Pasadena, both of Calif.

[73] Assignee: Storage Technology Corporation, Louisville, Colo.

[21] Appl. No.: 279,099

[22] Filed: Jun. 30, 1981

[51] Int. Cl.³ .............................................. G01J 1/20
[52] U.S. Cl. ..................................... 250/201; 369/44
[58] Field of Search ............... 250/201, 204, 230, 209, 250/570, 234–236; 369/44, 45, 46

[56] References Cited

U.S. PATENT DOCUMENTS

| | | | |
|---|---|---|---|
| 2,065,365 | 12/1936 | Doyle et al. | 250/230 |
| 3,970,845 | 7/1976 | Hollis et al. | 250/201 |
| 4,005,260 | 1/1977 | Janssen | 369/44 |
| 4,330,880 | 5/1982 | Van Dijk | 369/44 |
| 4,358,796 | 11/1982 | Ceshkovsky et al. | 369/45 |

Primary Examiner—David C. Nelms
Attorney, Agent, or Firm—Woodcock, Washburn, Kurtz, Mackiewicz & Norris

[57] ABSTRACT

Apparatus for reading information stored in a track pattern on a radiation reflecting record comprises a source of radiation for supplying a reading beam a tracking mirror assembly controllable for directing the reading beam in a radial direction on the record, an objective lens for controlling focus, a data photodetector and at least a first paired photodetector array including separated sectors for providing tracking error correction signals, optical detenting means comprising at least a second source of radiation fixed in place relative to an undeflected position of the tracking mirror and a second paired photodetector array associated with the second source for detecting movement of the tracking mirror from its undeflected position and means coupled from the output of the second photodetector array to the tracking mirror assembly for providing error correction signals to maintain the detent conditions during slewing.

7 Claims, 3 Drawing Figures

TRACKING MIRROR ASSEMBLY AND CONTROL SYSTEM FOR AN OPTICAL DATA STORAGE DISC

This invention relates to optical systems for retrieving information recorded in the form of a pattern on a record or disc (an optical data storage disc). More particularly, this invention relates to a tracking mirror assembly and control system for use in an apparatus for recording and reading information in a track pattern on a radiation reflecting record.

The present technology for high density, serial optical data recording depends upon the focusing of a beam of light to a very small spot (e.g., of submicron diameter) in order to minimize the required laser power as well as to maximize data density. Whereas commercially available machines (such as those based upon consumer video playback apparatus) have employed objective lens numerical apertures of the order of 0.45, the application of optical recording technology to high density data should utilize numerical apertures significantly closer to the theoretical maximum (e.g., preferably 0.95). The resulting small spot size, however, is not realized without attendant problems since the focusing and tracking problems associated with high numerical aperture optics and imperfect (uneven) discs are more severe. Thus improved optical systems, including accurate focus and tracking error detection, are required.

In general, it has been found to be advantageous to mount the optical system of a data storage disc arrangement on a servocontrolled carriage which is guided in a radial direction across the disk to read and write information. In the currently available consumer video playback machines, the tracking control systems are only required to follow a spiral track (some proposed arrangements would make use of concentric tracks). The information is, in either case, recorded with a certain continuity (as in the case of entertainment material) and the radial movement of the optical system is relatively smooth, of small displacement, and at a relatively slow rate.

A number of different types of tracking mirror assemblies and servo systems are known which are suitable for such applications (see, for example, *Philips Technical Review*, Volume 33, No. 7, 1973, pages 178-193 and U.S. Pat. Nos. 4,011,003—Dragt and 4,021,096—Dragt).

However, in the case of digital data storage systems, rapid, random access of the recorded information is required. Access time requirements typically result in radial carriage movements which subject the optical system, including the tracking mirror assembly, up to 20 "g's" of acceleration. The customary low friction pivotal mounting of the tracking mirror assembly with respect to an axis perpendicular to the radial direction would result in unacceptable displacement (tilting) of the tracking mirror in the "seek" or data track acquisition mode of operation.

Mechanical detenting mechanisms for holding the tracking mirror in a fixed position during rapid track scanning have been found to be unsatisfactory.

In accordance with the present invention, apparatus for reading information stored in a track pattern on a radiation reflecting record comprises a source of radiation for supplying at least a reading beam, a tracking mirror assembly disposed in the optical path of the recording beam and controllable for directing said reading beam in a radial direction on said record, an objective lens means for passing the reading beam to the record and for controllably focusing the reading beam at a plane of focus. A photodetector array is disposed in an optical path which includes the objective lens means, the photodetector array comprising a data photodetector disposed for impingement thereon of the reading beam component for sensing the stored information and at least a first paired photodetector array adjacent to the data photodetector, the paired photodetector array including separated sectors for sensing relative differences of the reading beam impinging on the sectors to provide at least tracking error correction signals to the tracking mirror assembly. Means are associated with the tracking mirror assembly for providing optical detenting of the tracking mirror assembly during a slewing mode of operation. The optical detenting means comprises at least a second source of radiation fixed in place relative to an undeflected position of the tracking mirror and a second paired photodetector array associated with the second source for detecting movement of the tracking mirror from its undeflected position. Means are provided for coupling an error signal from the output of the second photodetector array to the tracking mirror assembly to maintain the detent condition during slewing.

These and other aspects of the present invention will become apparent from a consideration of the following description and the attached drawing in which.

Figure 1:
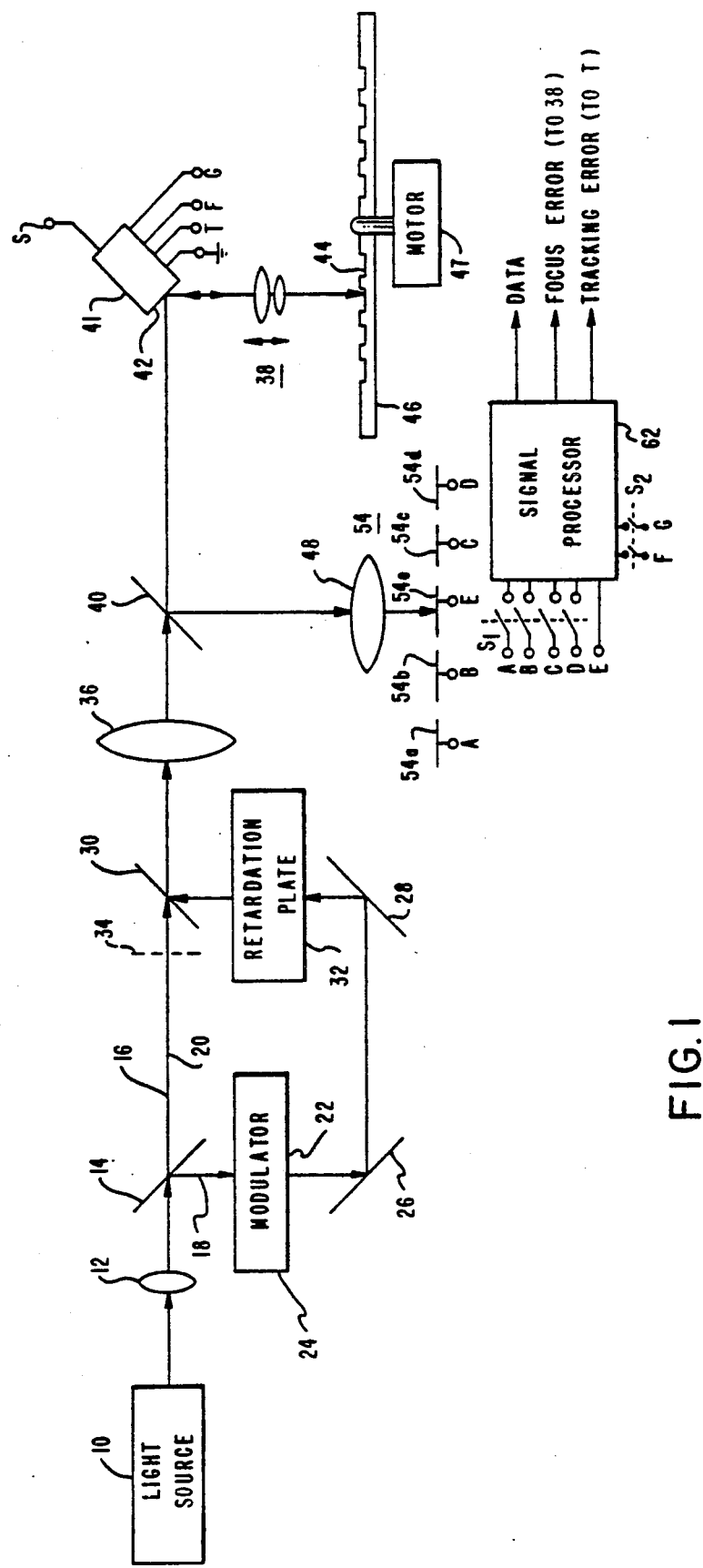
FIG. 1 illustrates in schematic diagram form a direct read after write (DRAW) apparatus incorporating the present invention.

Referring to FIG. 1, in a direct read after write (DRAW) system for storing and retrieving information, a source of illumination 10, for example a HeNe gas laser or an AlGaAs diode laser, emits radiation which is focused by a lens 12. The resulting focused beam is split by a partially transmitting mirror 14 into a read beam 16 and a write beam 18. The read beam 16 is focused at a position 20 while the write beam 18 is focused at a position 22. If the source of illumination 10 is not capable of being modulated internally, then the write beam 18 is modulated in accordance with the information to be recorded by an active optical modulating device 24 such as an acousto-optic or electro-optic modulator. The modulated write beam output of modulating device 24 is reflected by mirrors 26, 28 to a beam combiner 30 such as a partially transmitting mirror. Typically, a wave retardation plate 32 is inserted in the write beam path and, in that case, combiner 30 may be a polarization beam combiner.

The read beam 16, after being brought to a focus at position 20, is diffracted, for example, by a diffraction grating 34 to provide at least a zero order beam component and a pair of first order beam components. It should be noted that the diffraction function can be accomplished at other points in the system as will be apparent to persons familiar with this art. In the arrangement shown in FIG. 1, the diffracted and undiffracted beam components are each transmited by combiner 30.

The combined read and write radiation passes through a lens system 36 which optimizes the diameter and wave front of the radiation for passage through a positionable objective lens system 38. After passing through lens system 36, the combined radiation passes through a further partially transmitting mirror 40 and is reflected by a controllably positioned device 42 such as a mirror mounted on a pivoted coil arrangement 41 which will be described in greater detail below. Device 42 will hereinafter be referred to as tracking mirror 42.

The read and write beams reflected by tracking mirror 42 are focused by the objective lens system 38 at a recording medium 44. Recording medium 44 is disposed on a rotatable disc 46. A motor 47 drives the disc 46 in a predetermined manner.

The spatial separation between the zero order read beam spot and either of the first order read beam spots at the recording medium 44 is of the order of a few microns and is determined by the distance between focus 20 and grating 34, the efl of lens 35, the efl of objective 38, the grating frequency (of grating 34) and the wavelength of the radiation of read beam 16.

A portion of the read beam radiation is reflected by the recording medium 44, collected by the objective lens system 38, reflected by the tracking mirror 42, and reflected by the partially transmitting mirror 40 into a detection path including a lens assembly 48 and a detector array 54.

Detector array 54 comprises a unitary photosensitive data detection element 54e arranged for impingement by a zero order reflected beam component, a first pair of photodetector sectors 54a, 54b and a second pair of photodetector sectors 54c, 54d, the pairs of sectors being arranged for impingement of the first order beam components produced by virtue of the diffraction grating 34.

Output signals are derived from each of the detector elememts 54a-54e at output terminals, A, B, C, D and E as shown in FIG. 1. The respective output signals are combined in an appropriate manner in a signal processor 62 (FIG. 1) to produce a data signal output and at least a tracking error output as will appear below.

The signal processor 62 is coupled to the output terminals A-D of detector elements 54a-54d by means of a four pole switch $S_1$. The switch $S_1$ is closed during normal data recovery operation of the system will appear below. The signal output obtained from central photodetector element 54e is coupled via processor 62 to provide the detected "DATA" output.

Suitable arrangements for obtaining a focus error signal output are described, for example, in copending U.S. patent application Ser. No. 279,101 of Reilly, Laub and Swaminathan, entitled "Apparatus for Reading Information Stored in a Track Pattern on a Radiation Reflecting Record".

One focus error signal (FES) for control of the position of objective lens assembly 38 relative to disc 46 is produced, for example, by algebraic combination of signals, P, from detector elements 54a-54d. Specifically, one type of focus error signal (FES) may be provided by combination of signals in processor 62 according to the expression:

$$(FES) = (P54a - P54b) + (P54d - P54c).$$

A tracking error signal is derived in signal processor 62 by algebraic combination of the outputs from detector elements 54a -54d according to the expression:

$$\text{Tracking Error} = (P54a - P54b) + (P54c - P54d).$$

The sign of the tracking error signal will indicate the direction of deviation of the read spot from the appropriate track while the magnitude will represent the magnitude of the tracking misalignment. The resulting Tracking Error Signal (TES) is coupled to a coil assembly 41 by means of a terminal T to form a closed servo loop to maintain the appropriate alignment of the read spot with the data tracks on disc 46 by appropriate tilting of tracking mirror 42.

In accordance with one aspect of the present invention, means are also provided in conjunction with tracking mirror 42 and coil assembly 41 for maintaining tracking mirror 42 in a predetermined reference position during slewing (rapid motion) of the carriage assembly (not shown) associated with radial movement of the optical assemblies (including mirror 42) relative to disc 46.

As is shown in FIG. 1, additional output terminals F and G are associated with the apparatus including coil assembly 41 and tracking mirror 42. Output terminals F and G are coupled to similarly labelled terminals associated with signal processor 62. Detent control signals are coupled via terminals F and G and a two pole switch $S_2$ to signal processor 62. As will be explained below, the detent control signals provided at terminals F and G are substituted for the tracking error signal components (terminals A-D) during the slewing operating mode. A voltage supply terminal labelled "S" is also associated with the assembly 41,42, the purpose of which will appear from a consideration of the structure shown in FIGS. 2 and 3.

Figure 2:
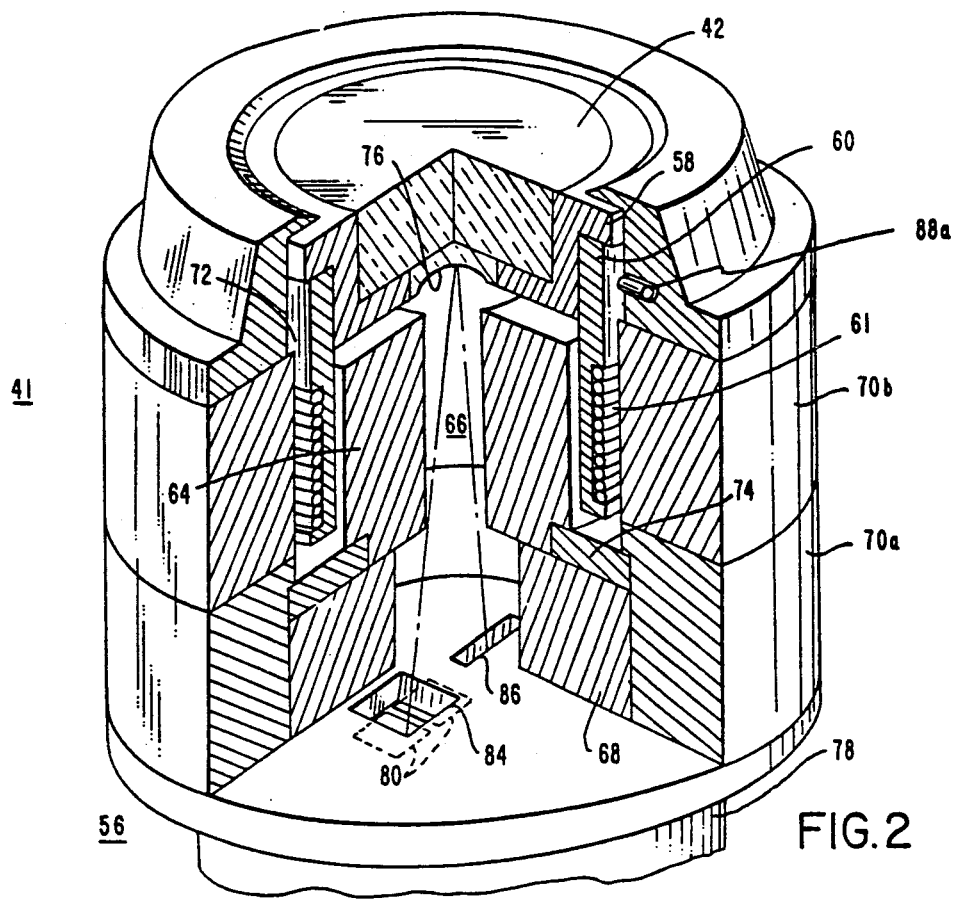
FIG. 2 illustrates, in a cutaway perspective view, a tracking mirror assembly constructed in accordance with the present invention.
Figure 3:
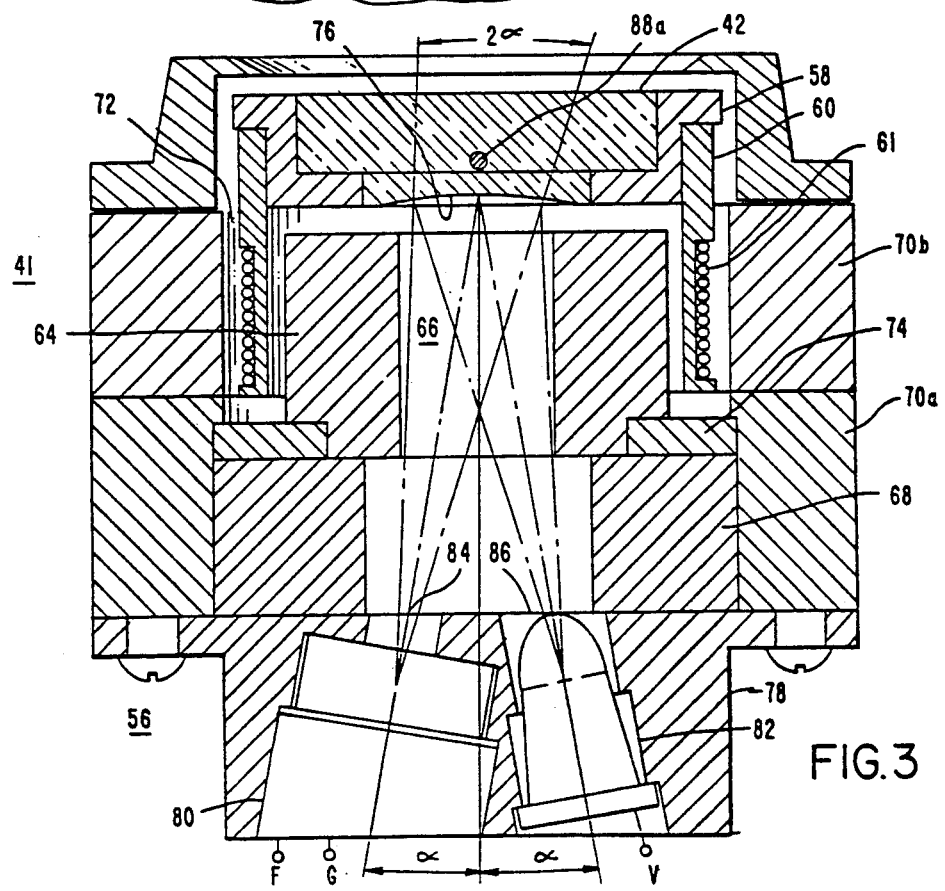
FIG. 3 is a sectional view of the assembly of FIG. 2.

Referring to FIGS. 2 and 3, a preferred arrangement is shown for an assembly of a tracking mirror 42, a coil assembly 41 and an associated optical detent arrangement indicated generally by reference numeral 56.

The illlustrated tracking apparatus is in the form of a moving coil galvanometer assembly 41. Tracking mirror 42 is mounted on a cup shaped support member 58 of non-magnetic material. A tubular coil form 60 (e.g. of plastic of impregnated paper) is fastened to support member 58 and serves to support a coil 61, one end of which is coupled to an electrical reference potential (e.g. ground as shown in FIG. 1) and the other end of which is coupled to a control signal terminal T. The moving coil galvanometer assembly 41 further comprises a magnet assembly comprising a cylindrical (or ring shaped) center pole member 64 having a central aperture 66, an annular (or ring-shaped) radially magnetized permanent magnet 68 adjacent and magnetically coupled to center pole member 64, and cylindrical outer pole pieces 70a and 70b magnetically coupled to magnet 68 and disposed external and adjacent to coil 61 for completing a magnetic path across an air gap 72. A non-magnetic locater ring 74 serve to align the pole pieces 64, 70a, 70b to provide a concentric air gap 72. In accordance with certain aspects of the present invention, a concave mirror 76 is associated with (e.g. attached to) the underside of tracking mirror 42. Optical detent assembly 56 comprising a mounting flange 78, a two-element photodetector assembly 80 and a light source 82, such as a light emitting diode (LED), is fastened to outer pole piece 70a as shown in FIG. 2. The components of the optical detent assembly are aligned in a predetermined angular relationship with respect to the axis of the coil assembly 41 and the mirrors 42 and 76 as will appear below. Slots 84 and 86 are provided in mounting flange 78 to permit passage of light from LED 82 to mirror 76 and back to photodetector 80.

As is best seen in FIG. 3, the assembly including a moving coil 61, coil form 60, tracking mirror 42, and cup-shaped support member 58 is pivotally mounted by means of bearings 88a (and 88b) disposed along an axis which is perpendicular to the radial direction associated with record disc 46.

In the operation of the apparatus constructed according to the present invention, during either the read or write mode, the optical tracking apparatus including pivotable mirror 42 is employed to properly position the objective lens 38 in a radial direction relative to the recorded tracks 44. This positioning is required to overcome radial runout of the record disc 46 is well as to maintain radial tracking for non-concentric recorded tracks. The first order beams falling on photodetectors 54a, 54b and 54c and 54d are sensed at photodetector 54. A difference signal representing mistracking is generated in signal processor 62 (by algebraic combination as noted previously) and the resultant tracking error signal (T) is coupled to coil 61. Interaction of the tracking error signal current in coil 61 and the magnetic field provided by magnet 68 and the associated pole pieces 64, 70a, 70b causes the assembly 41 including tracking mirror 42 to pivot about the pivot axis associated with bearings 88a,88b. The mirror 42 reflects the read-write light beam at an appropriate angle through objective lens assembly 38 to maintain the required tracking.

During this normal tracking mode of operation, the switch S$_1$ associated with terminals, A, B, C and D is closed while the switch S$_2$ associated with terminals F, G is open. In that case, the LED 82 and two-element photodetector 80 have no effect on the operation of the system. However, in the track acquisition or slewing mode of operation of the system, the assembly including mirror 42 has a tendency to tilt undesirably due to acceleration (g) forces. By necessity, the pivotal arrangement of mirror 42 exhibits very low friction so that mirror 42 may readily be positioned as needed. However, with such low friction mounting, the mirror 42 is also sensitive to imbalances of either a static or a dynamic nature. In order to avoid undesired tilting of mirror 42 either during slewing or when the overall system is at rest, LED 83, photodetector 80, mirror 76 and the normal tracking servo loop are utilized to provide an optical detent system for tracking mirror 42.

In the detent mode of operation, switch S$_2$ is closed, switch S$_1$ is opened and the outputs F and G of photodetector 80 are substituted in signal processor 62 for the outputs of elements A, B, C and D in an appropriate manner. The LED 82 is mounted with its centerline displaced by an angle from the centerline of the overall assembly shown in FIG. 2 and the photodetector 80 is displaced by an equal and opposite angle from that axis. As a result, when the tracking mirror 42 is perpendicular to the axis of the assembly (i.e. not tilted), the concave mirror 76 causes the light output from LED 86 to fall equally on the two detection elements of photodetector 80 (i.e. the signals at outputs F and G are equal). In that case, the tracking error output (T) from signal processor 62 will be zero and coil 61 will be unenergized. In the event the mirror assembly 42, 76 tilts due to imbalance, one of the outputs F, G will increase while the other will decrease. A resulting simulated "tracking error signal" based on the difference will be provided from signal processor 62 to coil 61 to return the mirror assembly, 41,76 (and coil 61) to its zero (detent) position.

It should be noted that the magnet assembly 64,68 is dimensioned, including the passage 66, to permit the necessary light energy of LED 86 to pass to and from concave mirror 76. The slots 86 and 84 also are dimensioned and shaped in an appropriate manner.

While the invention has been described in terms of a preferred embodiment, various modifications may be made within the scope of the invention which is set forth in the appended claims.

What is claimed is:

1. Apparatus for reading information stored in a track pattern on a radiation reflecting record comprising:
   a source of radiation for supplying at least a reading beam;
   a tracking mirror assembly disposed in the optical path of the reading beam and controllable for directing said reading beam in a radial direction on said record;
   an objective lens means for passing said reading beam to said record and for controllably focusing said reading beam at a plane of focus;
   a photodetector array disposed in an optical path which includes said objective lens means, said photodetector array comprising a data photodetector disposed for impingement thereon of said reading beam for sensing said stored information and at least a first paired photodetector array adjacent to said data photodetector, said paired photodetector array including separated sectors for sensing relative differences of said reading beam impinging on said sectors to provide at least tracking error correction signals to said tracking mirror assembly;
   detenting means associated with said tracking mirror assembly for providing optical detenting of said tracking mirror assembly during a slewing mode of operation;
   said optical detenting means comprising at least a second source of radiation fixed in place relative to an undeflected position of said tracking mirror and a second paired photodetector array associated with said second source for detecting movement of said tracking mirror from its undeflected position; and
   means coupled from the output of said second photodetector array to said tracking mirror assembly for providing error correction signals for maintaining the detent condition during slewing.

2. Apparatus according to claim 1 wherein said tracking mirror assembly comprises a pivotally mounted tracking mirror, said second source of radiation comprises a source of light energy mounted in predetermined angular relationship to a reference position of said tracking mirror and said second paried photodetector array is in predetermined aligned relationship with said source of light energy so as to provide substantially equal outputs from each element of its pair when said tracking mirror is in its reference position.

3. Apparatus according to claim 2 wherein said first paired photodetector array is switchably coupled to said tracking mirror assembly for providing tracking error signal thereto and said second paired photodetector array is switchably coupled to said tracking mirror assembly for providing detenting signals thereto.

4. Apparatus according to claim 3 wherein said tracking mirror assembly further comprises a coil associated with said tracking mirror and responsive to said tracking error signals and said detenting signals for controllably pivoting said tracking mirror.

5. Apparatus according to claim 4 wherein said first and second paired photodetector arrays are of substantially directly comparable construction for providing similar output signals in response to light impinging thereon.

6. Apparatus according to claim 4 wherein said tracking mirror assembly further comprises a second mirror coupled to said pivotably mounted tracking mirror and disposed in optical path between sad second source of light energy and said second paired photodetector array for distributing light from said second source substantially equally on the elements of said second array when said tracking mirror is in a reference position.

7. Apparatus according to claim 6 wherein said tracking mirror assembly further comprises a permanent magnet assembly associated with said coil and having a central aperture for passing light from said second source of light to said second mirror and to said second array.

* * * * *